United States Patent [19]

Culp

[11] Patent Number: 5,017,820

[45] Date of Patent: May 21, 1991

[54] PIEZOELECTRIC ROTARY UNION SYSTEM

[75] Inventor: Gordon W. Culp, Van Nuys, Calif.

[73] Assignee: Rockwell International Corporation, El Segundo, Calif.

[21] Appl. No.: 513,132

[22] Filed: Apr. 23, 1990

[51] Int. Cl.$^5$ .......................................... H01L 41/08
[52] U.S. Cl. ......................................................... 310/328
[58] Field of Search ............................................ 310/328

[56] References Cited

U.S. PATENT DOCUMENTS

| | | | |
|---|---|---|---|
| 3,902,085 | 8/1975 | Bizzigotti | 310/328 |
| 4,831,306 | 5/1989 | Staufenberg | 310/328 |
| 4,884,003 | 11/1989 | Hayes | 310/328 |
| 4,928,030 | 5/1990 | Culp | 310/328 |

FOREIGN PATENT DOCUMENTS

| | | | |
|---|---|---|---|
| 0204272 | 10/1985 | Japan | 310/328 |
| 0219972 | 11/1985 | Japan | 310/328 |
| 0180583 | 8/1986 | Japan | 310/328 |
| 0180584 | 8/1986 | Japan | 310/328 |
| 0085682 | 4/1987 | Japan | 310/328 |
| 0145309 | 6/1987 | Japan | 310/328 |
| 0189978 | 8/1987 | Japan | 310/328 |
| 0189979 | 8/1987 | Japan | 310/328 |

OTHER PUBLICATIONS

Lewis Research Center, "Multihundred-Kilowatt Rotary Electrical-Transfer Device," advertised in NASA Tech Briefs, Mar. 1989.

*Primary Examiner*—Mark O. Budd
*Assistant Examiner*—Thomas M. Dougherty
*Attorney, Agent, or Firm*—H. Fredrick Hamann; Harry B. Field; John McFarren

[57] ABSTRACT

A light weight, efficient, and compact piezoelectric rotary union system is provided for joining structures such as space station modules. The system comprises piezoelectric actuators attached to a first structure that engage and rotate a ring attached to a second structure. The actuators position and rotate the ring by non-sliding, smooth walking motion that provides high mechanical efficiency, long life, and negligible electrical noise. Electrical conductors embedded in the ring and the actuator traction surfaces transmit electric currents and signals between the structures. Moderate traction pressure and large contact area substantially eliminate contact heating and associated vacuum welding. The piezoelectric actuators generate relatively large translational forces at relatively low speeds. The absence of conventional rolling bearings eases connection and disconnection of the rotary union. Piezoelectric actuators with integral sensors can control the shape and stress of a relatively light and flexible ring, and can actively reduce or cancel structural vibrations.

12 Claims, 1 Drawing Sheet

PIEZOELECTRIC ROTARY UNION SYSTEM

TECHNICAL FIELD

The present invention relates to piezoelectric devices and, in particular, to a rotary union system using piezoelectric actuators to provide relative rotation of joined structures.

BACKGROUND OF THE INVENTION

Rotatable connection systems that provide rotary unions for large structures, such as space station modules and connecting structures, impose severe demands on contact elements. In conventional roller bearing unions, the mechanisms that provide relative rotation, usually considered separate subsystems, rely on cables, bands, chains, or gears. These mechanisms are mechanically complex and have undesirable aspects such as large mass, sliding friction, difficulty of separation, and difficulty of electric signal transfer across the rotating union. Furthermore, the rolling elements experience high contact pressure and eventually wear out, notwithstanding the use of dry lubricants formulated for vacuum environments. Worn bearings cause rough operation and detrimental structural vibrations that must be controlled. Even the smallest structural vibrations unload some of the rolling elements, causing rattling. Rattling accelerates wear and induces high frequency acoustic noise in adjacent structures. Conventional rotary union systems also experience a problem referred to as slop. Slop generally encompasses phenomena such as gear backlash, bearing clearance play, elastic bending, mechanical compliance, and misalignment that all contribute to a failure of the rotary union to achieve a desired position, torque, or angular velocity. Also, distortion of large diameter bearing races leads to additional wear and the necessity for higher than desired rotating torque. The greater structural integrity needed to ensure bearing alignment usually results in an unacceptable weight penalty, particularly in space stations. In addition, differential thermal expansion between conventional steel bearing races and light metal or composite bearing support structures becomes a formidable problem in space, especially when one portion of the bearing is shadowed while the rest of the bearing is exposed to direct sunlight.

In operation, a rotary union system does not require much energy to maintain a constant angular velocity but it must have enough torque to accelerate or decelerate the joined structures at a desired angular rate and overcome increased friction as the mechanism ages. Electromagnetic motors, which have slip-rings and other commutating devices, may be used to drive the system, but motors are relatively inefficient and require heat removal in many applications. The sliding of motor brushes on annular slip-rings causes resistive heating, contact welding, electrical noise, and constant wear, all contributing to low system efficiency. Therefore, there is a need for an improved rotary union system for large structures that is relatively simple, light in weight, efficient, easily connected and disconnected with reduced slop, and able to transmit multiple electrical signals across the rotating connection.

SUMMARY OF THE INVENTION

Piezoelectric actuators have advantages for use in remote and extreme environments because of their high efficiency and ability to operate on direct current without the need for lubrication or cooling. Detailed descriptions of piezoelectric actuators and electronic drive systems that produce piezoelectric "smooth walking" are set forth in the following co-pending U.S. patent applications, which are incorporated herein by reference: Ser. No. 252,197 filed Sept. 30, 1988, and Ser. No. 488,548 filed Mar. 5, 1990.

The rotary union system of the present invention is designed to transfer electric power and rotary motion from one structure to another. The system comprises a ring attached to a first structure, and a plurality of opposing piezoelectric actuator pairs attached to a second structure for receiving and engaging the ring of the first structure. The ring has a circumference that is rotatable about a central axis of rotation. Each piezoelectric actuator comprises "lifter," "tangenter," and "axier" segments having radial, tangential, and axial motion, respectively, and a traction surface comprising a "tractor." When the first and second structures are joined, the opposing actuator pairs of the first structure maintain a vise-like grip on the ring of the second structure. The tractors of opposing actuator pairs grip the inner and outer surfaces of a segment of the ring without using bearings. Zero clearance and full contact of the opposing tractors provide a relatively high mechanical stiffness that allows very precise positioning of the ring. Smooth walking actuator motion is used to position and rotate the ring, thereby rotating and positioning the first structure with respect to the second. With adequate structural rigidity, smooth walking motion of opposing tractors essentially eliminates slop from the rotary union.

BRIEF DESCRIPTION OF THE DRAWINGS

For a more complete understanding of the present invention and for further advantages thereof, the following Description of the Preferred Embodiment makes reference to the accompanying Drawings. The same reference numerals indicate the same or similar components in the several Figures, in which.

DESCRIPTION OF THE PREFERRED EMBODIMENT

Figure 1:
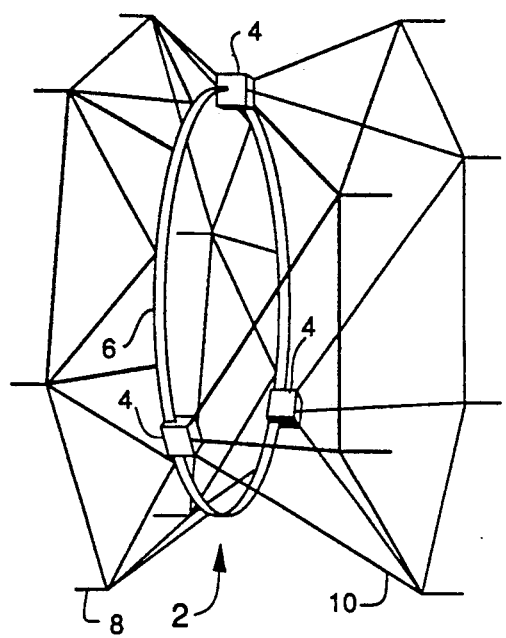
FIG. 1 is a perspective view of a piezoelectric rotary union of the present invention.

Referring to FIG. 1, a piezoelectric rotary union of the present invention is generally indicated by reference numeral 2. Rotary union 2 connects a first structure 8 to a second structure 10. Union 2 provides for the transfer of electrical signals and power from one structure to the other and the rotation of one structure with respect to the other. Structures 8 and 10 may comprise rotatable space station modules, for example. Rotary union 2 comprises an annular ring 6 rigidly attached to structure 8 and a plurality of piezoelectric actuator modules 4 attached to structure 10. Actuator modules 4 are designed and positioned to receive and engage annular ring 6 to form rotary union 2.

Figure 2:
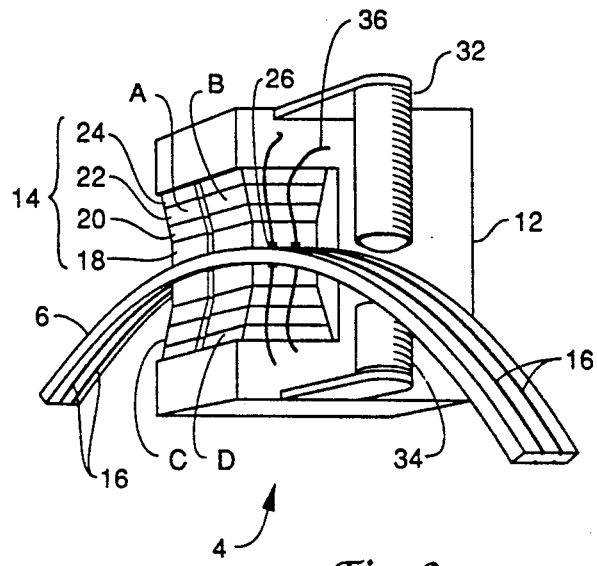
FIG. 2 is a perspective view of opposing pairs of piezoelectric actuators of the present invention.

FIG. 2 illustrates an actuator module 4 engaging a segment of ring 6. Actuator module 4 comprises two pairs of opposed piezoelectric actuators 14, designated as actuators A, B, C, and D, mounted in a housing 12. A ring position sensor, such as transmitter 32 and detector 34, may be attached to housing 12. Each piezoelectric actuator 14 comprises a traction segment 18 called a "tractor," a tangentially acting piezoelectric segment 20 called a "tangenter," an axially acting piezoelectric portion 22 called an "axier", and a radially acting piezoelectric segment 24 called a "lifter." Each of the piezoelectric portions may comprise a piezoelectric dimorph that converts an applied electric potential to mechanical motion in one of the three orthogonal directions described above. Any piezoelectric effect material may be used, for example, the actuators may comprise electrostrictive, electromagnetic, magnetoremanent, magnetostrictive, piezocomposite, ferroelectric and thermoexpansive materials. The electrical drive system and electrical connections to each of the dimorphs are omitted from the Figures for clarity of illustration. Because the segments of actuators 14 are bonded in a stack attached to housing 12 at the end opposite tractor 18, the mechanical motion of tractor 18 is the vector sum of the motions of the piezoelectric segments 20, 22, and 24. Actuator pairs, such as pair A and C and pair B and D, are mounted in housing 12 in opposing relationship with a gap or slot for receiving ring 6 between opposing tractors 18. The slot between tractors 18 just clears the thickness of ring 6 when a predetermined electric potential is applied to all four lifters 24 to open the slot. Other predetermined electric potentials generated by the electrical drive system (not shown) can be applied to actuators 14 to move and position ring 6 by smooth walking motion of tractors 18 as described in co-pending application Ser. No. 488,548 filed Mar. 5, 1990, incorporated herein by reference. For example, actuator pair A-C can be operated together to grip and position ring 6 while actuator pair B-D lifts clear and retraces its position over ring 6 in preparation for another contact and positioning cycle.

Figure 4:
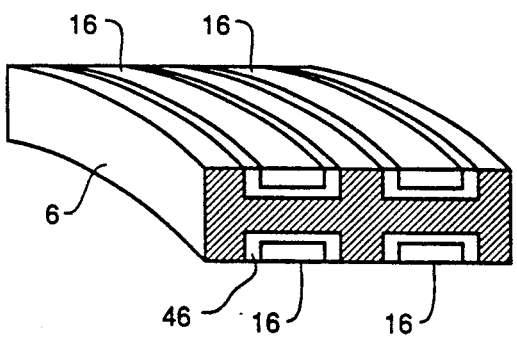
FIG. 4 is a perspective/cross-sectional view of a segment of the union ring of the present invention.
Figure 3:
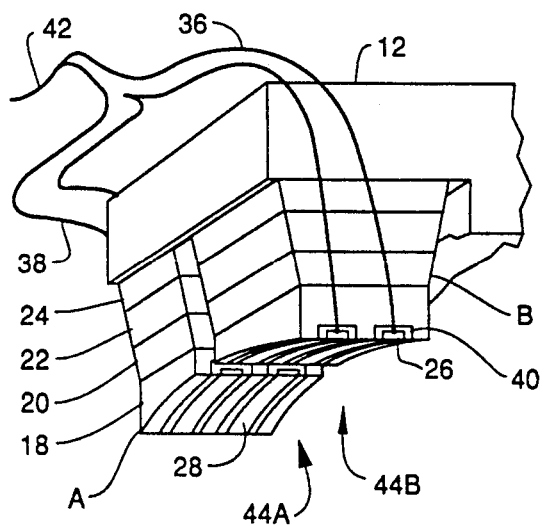
FIG. 3 is a perspective view of a portion of the piezoelectric actuators of FIG. 2.

FIG. 3 is a more detailed view of the upper actuators A and B of actuator module 4 of FIG. 2. The surface portions of tractor 18, indicated generally as surfaces 44A and 44B of actuators A and B, respectively, may contain embedded electrical conductors, such as conductors 26 and 28, connected to electrical leads 36 and 38, respectively. Electrically insulating liners 40 may be used to insulate conductors 26 and 28 for applications requiring electrically conductive tractor bodies 18. Pairs of conductors, such as conductors 26 and 28, are connected electrically by a loop 36 to a common lead 42 connected to electrical components of structure 10. The external and intrnal cylindrical surfaces of ring 6 have embedded annular electrical conductors 16, as illustrated in FIG. 4, that correspond to conductors 26 and 28 of actuators 14. Electrical connections (not shown) for annular conductors 16 of ring 6 can be made at the edge of ring 6 as is well-known in the art of conventional slip-rings. FIG. 4 is a cross-sectional perspective view of ring 6 that illustrates liners 46 used to electrically insulate conductors 16 for applications requiring an electrically conductive body of ring 6. At all times during actuator positioning and walking of ring 6, either tractor surface 44A and conductor 28 or tractor surface 44B and conductor 26 are in full non-sliding contact with ring 6 and conductors 16.

During connection of rotary union 2, structure 8 is guided by external forces into position with structure 10 while all actuator lifters 24 open the slots of actuator modules 4 by separating tractors 18 of opposing actuators. When ring 6 is partially engaged by actuator modules 4, actuators 14 commence walking motion to engage and position ring 6. A controller (not shown) uses signals from position detectors 32 and 34 to control the walking of actuators 14 to move ring 6 into proper position. Axiers 22 align and maintain alignment of ring conductors 16 with corresponding conductors 26 and 28 of tractors 18 while lifters 24 and tangenters 20 rotate ring 6 about its central axis by smooth walking.

Most applications of rotary union 2 require rotation at constant angular velocity of one structure relative to the other. Axiers 22 maintain alignment of respective electrical conductors during the rotation to insure that electrical power or signals are routed in the corresponding circuits. Rotary union 2 provides low electrical noise and resistance to the passage of electrical signals and power. Smooth walking traction of actuators 14 eliminates sliding friction. The traction provided by actuators 14 is generated by moderate pressure applied over a relatively large traction surface, such as surface 44A of actuator A and the corresponding surface of opposing tractor 18 of actuator C. The absence of sliding in combination with pressure normal to the traction surface results in insignificant electrical contact resistance, which provides relatively low electrical noise. Traction generally applies a pressure for traction that is greater than needed for satisfactory electrical contact.

During actuator walking, one pair of opposing actuators 14 act together to hold ring 6 in a vise-like grip while delivering its ring positioning stroke. The actuator grip maintains alignment of ring 6 in the slot between the retracing actuator pair to avoid retrace rubbing. Although three actuator modules 4 are illustrated in FIG. 1, two modules may suffice in some applications, while a large number of actuator modules may be desirable in applications such as those requiring high torque.

Structures requiring rotary union rings 6 larger than can be conveniently manufactured or launched into space must use segmented rings. The annular conductors 16 of segmented rings 6 may be electrically connected to each other or in parallel as is well known in the prior art. The use of multiple actuator modules 4 shortens the length of the current paths along segments of ring 6. Multiple actuator modules 4 also provide a predetermined degree of redundancy for applications having relatively stringent reliability requirements.

The piezoelectric rotary union 2 of the present invention provides relatively large torque at relatively slow speed; transmits electrical current with low electrical noise and negligible heating; and allows repeated union parting, reengagement, rotating, and positioning with negligible sliding friction. Union 2 operates in a vacuum to control mechanical rotation without bearings and to actively damp structural vibrations. The use of piezoelectic actuators provides high electrical and mechanical efficiency in a light weight and compact apparatus that generates negligible heat while holding a stationary position. Furthermore, the piezoelectric actuators can be used to provide feedback signals indicative of the stress of adjunct structures to prevent distortion or damage.

Although the present invention has been described with respect to a specific embodiment thereof, various changes and modifications may be suggested to one skilled in the art. Therefore, it is intended that the present invention encompass such changes and modifications as fall within the scope of the appended claims.

I claim:

1. A rotary union system, comprising:
an annular ring attached to a first structure;
a piezoelectric actuator attached to a second structure; and
means associated with said actuator for engaging said ring to form a rotatable connection between said first and second structures.

2. The rotary union system of claim 1, further comprising at least two pairs of opposing piezoelectric actuators, each of said pairs of opposing actuators having opposing actuator traction surfaces positioned with a gap therebetween for engaging a segment of said annular ring.

3. The rotary union system of claim 2, further comprising means for generating walking motion by said traction surfaces of said actuators to position and rotate said annular ring, said opposing pairs of traction surfaces moving simultaneously to grip said ring segment in vise-like fashion.

4. The rotary union system of claim 3, further comprising means connected to at least one of said actuators for sensing alignment of said ring in said gaps.

5. A piezoelectric rotary union system, comprising:
an annular ring attached to a first structure;
at least two pairs of opposing piezoelectric actuators attached to a second structure;
each of said actuators having a traction surface and each of said pairs of opposing actuators having opposing traction surfaces positioned with a gap therebetween for engaging a segment of said annular ring;
means connected to at least one of said actuators for sensing alignment of said ring in said gap;
means for generating walking motion by said traction surfaces of said actuators to position and rotate said annular ring; and
said ring and said traction surfaces having conductive means for transmitting electrical signals between said first and second structures.

6. The rotary union system of claim 5, further comprising a plurality of piezoelectric modules attached to said second structure, each of said modules comprising at least two of said pairs of opposing piezoelectric actuators.

7. The rotary union system of claim 6, wherein said means for generating walking motion includes means for moving said opposing pairs of traction surfaces simultaneously to grip said ring segment in a vise-like manner.

8. The rotary union system of claim 7, further comprising means for separating said opposing traction surfaces to open said gap during engagement and disengagement of said annular ring.

9. A piezoelectric rotary union system for joining first and second structures with a rotatable connection, comprising:
an annular ring attached to the first structure;
a plurality of piezoelectric modules attached to the second structure, each of said modules comprising at least two pairs of opposing piezoelectric actuators;
each of said pairs of opposing actuators having opposing actuator traction surfaces positioned with a gap therebetween for engaging a segment of said annular ring;
means connected to at least one of said modules for sensing alignment of said ring in said gaps;
means for generating walking motion by said traction surfaces of said actuators to position and rotate said annular ring, said opposing pairs of traction surfaces moving simultaneously to grip said ring segment in vise-like fashion; and
said ring and said traction surfaces having conductive means for transmitting electrical signals between said first and second structures.

10. The rotary union system of claim 9, further comprising means for separating said opposing traction surfaces to open said gap during engagement and disengagement of said annular ring.

11. The rotary union system of claim 10, wherein said actuators include means for providing feedback signals indicative of stress of said ring to prevent distortion and damage to said structures.

12. A rotary union system comprising:
an annular ring attached to a first structure;
a piezoelectric actuator attached to a second structure; and
means associated with said actuator for engaging said ring to form a rotatable connection between said first and second structures;
at least two pairs of opposing piezoelectric actuators, each of said pairs of opposing actuators having opposing actuator traction surfaces positioned with a gap therebetween for engaging a segment of said annular ring;
a means for generating walking motion by said traction surfaces of said actuators to position and rotate said annular ring, said opposing pairs of traction surfaces moving simultaneously to grip said ring segment in vise like fashion;
conductive means connected to said ring and said traction surfaces for transmitting electrical signals between said first and second structures.

* * * * *